Sept. 1, 1959     D. B. PASQUALE     2,902,643
FUSE AND TUBE TESTING DEVICE

Filed June 12, 1956

INVENTOR
DAVID B. PASQUALE by Charles R. Fay,

ATTORNEY

United States Patent Office

2,902,643
Patented Sept. 1, 1959

2,902,643

FUSE AND TUBE TESTING DEVICE

David B. Pasquale, West Boylston, Mass.

Application June 12, 1956, Serial No. 590,997

3 Claims. (Cl. 324—53)

This invention relates to a new and improved testing device which is applied to a more or less conventional flashlight for the purpose of testing cartridge-type fuses, screw-in type fuses, and electronic tubes including those customarily found in radios and television sets. The invention also contemplates the use of an attachment for testing circuits in general and a separate attachment for remote control of the conventional flashlight lamp bulb.

One of the requisites of a tester of the kind described here is that it shall be of low voltage. The voltage in the commercial flashlight is very low and thus is safe for the testing of tubes and fuses. At the same time, fuses up to 600 volt capacity can also be tested and television circuits and other circuits may be tested as to breaks therein quickly and easily by use of the present device.

A further object of the invention resides in the provision of a simple and inexpensively manufactured and assembled elongated contact device which extends from the reflector shell at the lamp end of the flashlight to the opposite end thereof, said connection device being operatively associated with a new and improved socket, said socket receiving screw-type fuses for testing the same by operation of the flashlight bulb, and also selectively receiving a socket for connection thereto of other testing and remote control devices.

A further object of the invention resides in the provision of a testing device as above described which is simple, practical and reliable and may be easily carried in the pocket or tool box and which may be used by the householder for testing domestic fuses, radio tubes, etc.

Other objects and advantages of the invention will appear hereinafter.

Reference is to be had to the accompanying drawings, in which

Figure 1:
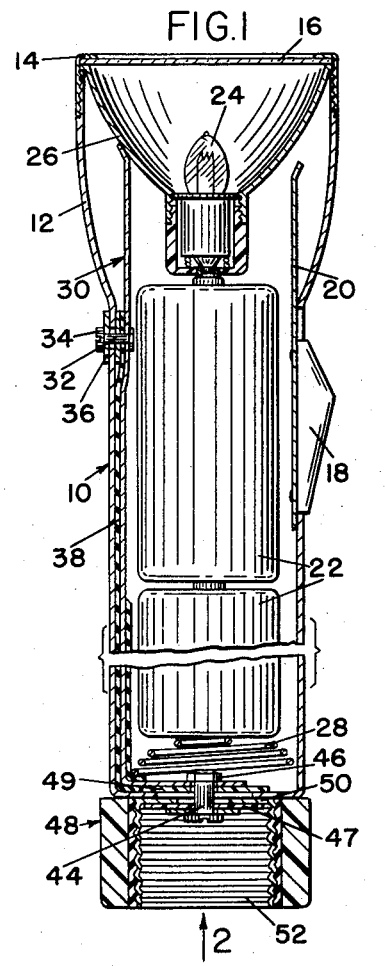
Fig. 1 is a vertical sectional view through a device of the class described.
Figure 2:
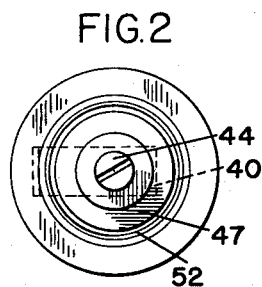
Fig. 2 is an end view, looking in the direction of arrow 2 in Fig. 1.
Figure 3:
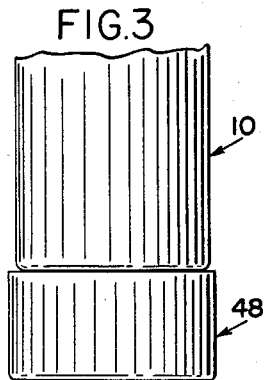
Fig. 3 is a view in elevation with parts broken away illustrating a form of the invention.
Figure 4:
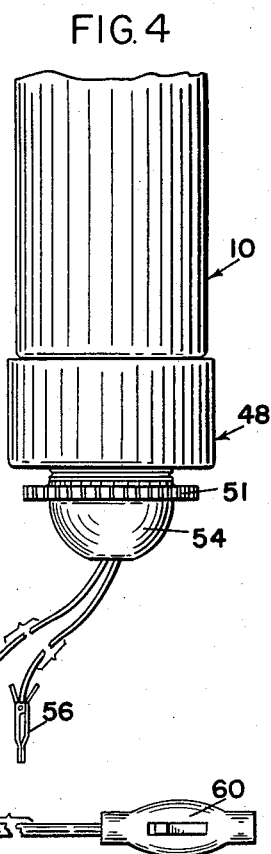
Fig. 4 is a view similar to Fig. 3 illustrating a different attachment.
Figure 7:
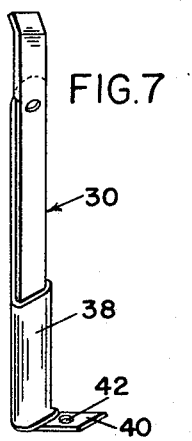
Fig. 7 is a view illustrating the electric connection extending from one end of the flashlight casing to the other.

Referring now to the drawings in detail, the reference numeral 10 indicates in general a metal or similar flashlight battery casing which has a forward end portion 12 on which is detachably mounted a cap 14 containing a lens 16. The casing is provided with an "on" and "off" switch 18 which operates a metal contactor make-and-break member 20. The reference numeral 22 indicates the batteries in the flashlight; the reference numeral 24 indicates the conventional lamp bulb, and the metallic reflector shield is indicated at 26. A spring 28 is conventionally found for pressing the batteries into contact with the holder for the lamp bulb. The parts above described are all conventional and found in the usual flashlight of the pocket type using small 1½ volt batteries or the like.

In carrying out the present invention, I provide an elongated metal strip which is generally indicated at 30 and is secured by a small screw or rivet 32 to the casing of the flashlight so that these parts are in fixed electric communication. The strip 30 is insulated from the casing 10 but contacts the reflector 26.

At the exterior of the casing, the screw or rivet 32 is provided with a head 34 which is insulated from the casing by a small fiber washer or the like 36. Therefore if a cartridge type fuse is placed in one end touching the head 34 and the other end touching any part of casing 10, a circuit will be completed by means of the novel current carrying strip 30 through the batteries to light lamp 24 if the fuse is a good one. However, if the fuse will not carry current, this will not result in lighting lamp 24 and therefore it will be immediately seen that the fuse is not operative.

The current carrying strip element 30 is insulated from the casing 10 by means of any kind of tape, rubber or other insulating material 38 and is provided with an in-turned flange or foot 40, the same being apertured at 42 to provide for the reception of a screw bolt 44 which extends into a nut 46 for the purpose of holding a socket generally indicated at 48 in position at the rear end of the flashlight. The screw 44 is provided with an insulating fiber washer 47 and this bears upon an in-turned flange 50 of the metallic screw-threaded part of the socket 52 to insulate the same from the screw 44, and to hold the parts in assembled relation. There is also an insulative washer 49 within the casing.

By screwing a regular screw-type fuse into this socket, the same sort of test may be applied as above described because a fuse that carries current will close the circuit to the lamp by connecting the metal threaded portion 52 to the screw 44, the base of the socket i.e. flange 50 being held in contact with the metallic casing of the flashlight.

A conventional socket member 51 may be screwed into socket 48 and a conventional wired pronged plug 54 may be applied thereto. With clips 56 on the wires for plug 54, these clips may be attached to any part of the circuit in order to determine if there is a break therein. If there is such a break, the flashlight lamp 24 will not be light; but if the circuit is closed between the points to which the clips 56 are secured, then the lamp will light, showing completion of the circuit.

Also, a different plug 58 may replace plug 54, plug 58 having a switch 60 by means of which the flashlight may be operated from a remote point by depending upon the length of the wires 62 connecting the switch 60 to the plug 58. It will be understood that the switch 60 merely connects or disconnects the two prongs 64 of plug 58.

Figure 5:
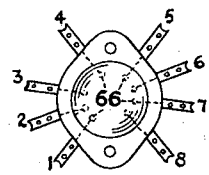
Fig. 5 illustrates a device for testing electronic tubes.

As shown in Fig. 5, there is a fixture which is provided with eight contacts indicated by the numerals 1 to 8 inclusive as shown, and each of these contacts is connected with a single socket of a series of sockets indicated at 66. A tube having prongs to fit these sockets may be inserted therein and the contacts 66 may then be connected across any of the contacts 1 to 8 inclusive to test the circuit thereof.

Figure 6:
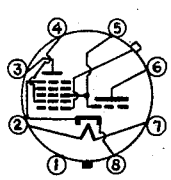
Fig. 6 is a conventional circuit diagram showing a tube which may be tested by the device of Fig. 5.

For instance, the two contacts 2 and 7 as shown in the diagram of Fig. 6 are connected across the filament, and if the lamp fails to light, then the filament is gone and the tube is no good. However, if any of the other contacts when connected by clips 56, 56 show a light in the flashlight, then this shows that the other parts of the electronic tube have failed and that the same should then be disposed of.

Many different tubes may be tested in this manner, depending upon different variations of fixture of the type shown in Fig. 5.

It will be seen that this invention provides a regular flashlight which may be operated by the usual switch. It uses regular type batteries and lamp bulbs which may be purchased almost anywhere for replacement purposes and the flashlight may be used to light the way to the basement of a dark house and test the fuses as above described, and in a very simple and quick manner. It is absolutely safe for anyone including children to use and may be used both in household and factory use as well as for testing radio and television tubes. The device may also be used to test circuits in general including antennas and continuity of cords and wires both household and commercial. Automotive lamps may be tested and when using the remote control device, it may be used for a call device for the sickbed, or for an extension for car trailers, etc.; or it may be used as a headlight for small boats, etc. or for call signals in general in other situations.

Having thus described my invention and the advantages thereof, I do not wish to be limited to the details herein disclosed, otherwise than as set forth in the claims, but what I claim is:

1. A portable flashlight and testing device comprising a substantially cylindrical metal casing, a flashlight lamp socket, lamp, and casing-insulated conductor member for the socket adjacent one end of the casing, a battery, a fixed elongated conductor strip connected to the conductor member at one end and extending to the other end of the casing, the casing terminating in an annular in-turned flange, an auxiliary socket including a metal threaded member, an annular flange on the latter in contact with the in-turned casing flange, a center contact in the socket connected to the conductor strip, the latter being insulated from the casing and the center contact being insulated from the metal threaded member, the center contact extending through the openings formed by said flanges out of contact thereof, and means fixing the center contact in this position, said last-named means including a portion of said strip.

2. A flashlight and testing device combined comprising an elongated metal casing, a lamp-socket and lamp at one end of the casing, the latter receiving a battery, an in-turned annular flange at the other end of the casing, said flange providing a central aperture, an elongated current-carrying strip in the casing, said strip extending from end-to-end thereof, a conductor member associated with the lamp-socket, an auxiliary socket on the casing at the flanged end thereof, said strip connecting the auxiliary socket and said member and being insulated from the casing, said auxiliary socket including a metal threaded member, and a fixed central contact insulated from the threaded member and from the casing, said central contact being connected to the elongated strip at one end thereof centrally of the aperture, whereby a screw-type electric element in the auxiliary socket causes completion of a circuit to light the lamp, means securing said metal threaded member to the flange, said last-named means comprising an insulative gasket in the metal threaded member and a head on the central contact, the head holding the gasket to the metal threaded member and insulating the central contact therefrom, said central contact firmly securing the said strip to the flange, and the strip and flange to the metal threaded member, the central contact passing through the strip and being held centrally of the casing thereby.

3. A flashlight and testing device combined comprising a metal casing, a lamp-socket and lamp at one end thereof, and a battery therefor, an elongated current-carrying strip in the casing, said strip extending from end-to-end of the casing, a conductor member associated with the lamp-socket, an auxiliary socket on the casing at the opposite end thereof, said strip connecting the auxiliary socket and said conductor member, a sleeve of insulation about the strip maintaining the same insulated from the casing, said auxiliary socket including a metal threaded member and a central contact insulated from the threaded member, a flange on said strip adjacent the latter, said central contact extending through the flange for electrical connection to the elongated strip, said flange holding the central contact in place, a circular flange on the threaded member, and an insulative gasket between the circular flange and the central contact, the circular flange being in contact with the casing for electric connection thereto.

References Cited in the file of this patent

UNITED STATES PATENTS

| 1,372,570 | Smith | Mar. 22, 1921 |
| 1,723,750 | Shore | Aug. 6, 1929 |
| 1,734,230 | Roe | Nov. 5, 1929 |
| 1,852,190 | Roe | Apr. 5, 1932 |
| 2,128,810 | Fortine | Aug. 30, 1938 |